United States Patent Office 3,129,053
Patented Apr. 14, 1964

3,129,053
DISPERSIONS OF ORGANIC DYES AND PIGMENTS
IN FLUOROALCOHOLS
John E. Castle, Hockessin, Del., assignor to E. I. du Pont
de Nemours and Company, Wilmington, Del., a corporation of Delaware
No Drawing. Filed May 21, 1962, Ser. No. 196,461
21 Claims. (Cl. 8—93)

This invention relates to new and improved compositions containing an organic colorant and a vehicle therefor. More particularly, it relates to, and has as its principal object provision of, dispersions, including molecular dispersions (solutions), of organic dyes and pigments in certain polyfluoroalcohols.

This application is a continuation-in-part of my copending application Ser. No. 159,162, filed December 13, 1961, and now abandoned.

Many organic coloring materials do not readily form stable dispersions or solutions in organic media. Even when such stable dispersions or solutions can be made, they often suffer from the disadvantage that the dispersing medium has only limited penetrating ability for the substrate to be dyed, either because it has little or no swelling or solvent action on that substrate, or because its surface tension is too high, or for both reasons. This fact leads to unsatisfactory results as regards depth of dyeing and adhesion of the dye to the substrate. While improvements in the properties of the dye vehicle are desirable even with soluble dyes, the need is greater with insoluble colorants, such as those belonging to the well-recognized class of organic pigments. As is known, organic pigments are insoluble in water and also insoluble, or very poorly soluble, in organic solvents. Their usefulness has been limited by the lack of vehicles which can either dissolve them or form stable colloidal dispersions wherein the solid colorant is extremely finely divided, and thus able to penetrate substrates of very tight surface structure.

This invention is based on the discovery that polyfluoroalcohols of the class defined later on have a unique ability to dissolve or intimately disperse a very large variety of organic compounds, among which are those containing the usual, well-known chromophore groups such as >C=O, >C=S, >C=N—, —N=N—, —NO, —NO$_2$, >C=C<, and —C≡C—. These fluoroalcohols are further characterized by a very low surface tension in the liquid state, generally in the range of 15–25 dynes/cm. By virtue of their low surface tension and of their extraordinary solvent ability, which is associated with their remarkably high hydrogen-bonding power, these fluoroalcohols are able to effect deep penetration into practically all substrates, even those of very low porosity. They are thus ideally suitable as vehicles for dyes and pigments.

The new compositions provided by this invention are dispersions of organic dyes and pigments in a liquid medium which is preponderantly organic and contains at least 15% by weight of a polyhaloalcohol in which all halogen atoms are fluorine or chlorine, said polyhaloalcohol having one of the formulas (I)

where R is a fluoroalkyl radical which can be fluoroperhalomethyl or difluoromethyl, or perfluoroalkyl, ω-hydroperfluoroalkyl or ω-chloroperfluoroalkyl of 2–6 carbon atoms; R' is a radical defined as R or a hydrocarbon, halohydrocarbon, hydroxyhydrocarbon or halohydroxyhydrocarbon radical of 1–10 carbon atoms; and A is H, OH or a radical defined as R, with the proviso that said polyhaloalcohol contains in its molecule at least two fluoroalkyl radicals defined as R, these being attached to hydroxyl-bearing carbon;

(II)
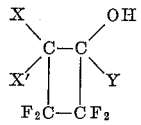

where X and X' are fluorine or chlorine and Y is OH, phenyl, halophenyl, hydroxyphenyl or alkoxy of 1 to 2 carbon atoms; and (III)
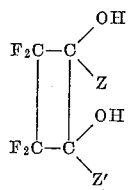

where Z and Z' are OH or alkoxy of 1–2 carbon atoms.

The invention also comprises the method of improving the dispersibility of organic dyes and pigments in a preponderantly organic liquid medium which comprises intimately mixing the dye or pigment with at least 50% by weight of a polyhaloalcohol as defined above.

The invention further includes a method of dyeing plastics made of polymeric materials sensitive to (i.e., swelled or dissolved by) the above-defined polyhaloalcohols, which method comprises bringing the surface of the plastic article in contact with a dispersion of a dye or pigment in said polyhaloalcohol for a time sufficient for appreciable attack of the surface to take place, then removing the dispersion medium, for example by evaporation. This treatment produces uniform etching or swelling of the plastic surface, which results in the formation of a tenaciously adherent colored coating resistant to removal or deterioration by washing or mechanical action.

By the term "dispersion" is meant a macroscopically homogeneous system where the size of the disperse particles may range downward from that which is just visible with an ordinary microscope, i.e., of the order of about $10^{-5}$ cm.; through an extremely fine colloidal size of the order of $10^{-7}$ cm., to the size of a molecular dispersion, i.e., a true solution. Whether they be dispersions or true solutions, the compositions of this invention are stable, in the sense that they show no tendency to settle or separate on at least 24 hours' standing at room temperature and in many cases are not separated when subjected to a centrifugal force of several thousand times the force of gravity.

It will be seen from Formulas I, II and III that the dispersants or solvents suitable for use in the compositions of this invention are secondary or tertiary polyfluoroalcohols having a specific structure. These alcohols can be monohydric or polyhydric, and among the latter are included the gem-diols or 1,1-diols (the products of the above formulas where A, Y, Z or Z', respectively, are OH). In fact, these gem-diols, which can also be called polyfluoroketone hydrates, are especially effective dispersing agents for the purposes of this invention.

The most accessible and therefore preferred polyfluoroalcohols are those corresponding to Formula I. In this formula the group designated by R' can be aliphatic, alicyclic or aromatic, saturated or unsaturated, and it can be hydrocarbon, e.g., —C$_6$H$_5$, —C≡CH, —C≡C$_6$H$_5$; halohydrocarbon, e.g., a group defined as R, or halophenyl; hydroxyhydrocarbon, e.g., hydroxyphenyl; or halohydroxyhydrocarbon, e.g.,

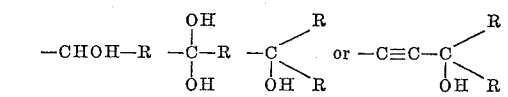

As already noted, the molecule should contain at least two fluoroalkyl groups, i.e., two groups defined as R, which may be alike or different, attached to either a single hydroxyl-bearing carbon atom or to two different hydroxyl-bearing carbon atoms. Thus, when the radical designated by R' does not contain such a group, then the radical designated by A is defined as R. The preferred compounds from the standpoint of effectiveness are those where A is H or OH and R' is defined as R, i.e., is fluoroperhalomethyl, difluoromethyl or perfluoroalkyl, ω-hydroperfluoroalkyl or ω-chloroperfluoroalkyl of 2–6 carbon atoms. The dispersing agents giving the best results are the polyfluoroketone hydrates or gem-diols (A=OH) and especially those corresponding to the polyfluoroperhaloacetones, i.e., the products corresponding to Formula I where A is OH and both R and R' are fluoroperhalomethyl, i.e., trifluoromethyl, chlorodifluoromethyl or dichlorofluoromethyl.

With certain highly insoluble, difficulty dispersible pigments, the quality of the dispersion is greatly improved when the above-defined fluoroalcohol dispersing medium has an acidity corresponding to a pH in the range of about 1 to 2. This specific aspect of the invention will be discussed later in greater detail.

Many of the above-defined secondary or tertiary polyfluoroalcohols can be prepared by methods described in the literature or by extensions of these published methods. Others are obtainable by methods described in copending patent applications. These include:

(1) The hydrates of open-chain polyfluoroketones (these gem-diols can also be prepared by the process of U.S. Patent 2,980,738) and the corresponding tertiary alcohols, i.e., the compounds of Formula I, where R, R' and A are fluoroalkyl radicals as defined. These compounds can be prepared, as described in U.S. Patent 3,091,643, by the reaction, in a molar ratio of at least 2:1, of an ester of a polyfluoroperhalo- or ω-hydropolyfluoroperhaloalkanecarboxylic acid with an alkali metal alkoxide at temperatures below about 100° C., followed by acidification. This reaction gives the ketones and/or their hydrates, i.e., the gem-diols. The tertiary alcohols are prepared from the ketones by further reaction with the alkali metal alkoxide in the same molar ratio and same temperature range, followed by acidification.

(2) The hydrates and hemiketals of polyfluoroperhalocyclobutanones, i.e., the products of Formula II, where Y is hydroxy or alkoxy. These compounds can be prepared by the method described in U.S. Patent 3,039,995. This method comprises the hydrolysis by concentrated sulfuric acid of the 1,3,3,4,4-pentafluoro-2,2-dihalo - 1 - hydrocarbyloxycyclobutanes, i.e., the ethers of the formula

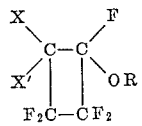

where X and X' are fluorine or chlorine and R is a hydrocarbon radical, which are themselves prepared by cycloaddition at 125–250° C. of the requisite difluoroperhaloolefin F₂C=C(XX') and a perfluorovinyl hydrocarbyl ether F₂C=CFOR. The hydrolysis step yields the polyfluoroperhalocyclobutanones and/or their hydrates. The free ketones form hydrates or hemiketals rapidly and spontaneously by reaction with water or alcohols.

(3) The 1-aryl-, 1-hydroxyaryl- and 1-haloarylperhalocyclobutanols, i.e., the compounds of Formula II, where Y is aryl, hydroxyaryl or haloaryl. These compounds can be prepared by the process described in application Serial No. 32,541, filed by D. C. England on May 31, 1960. In this process, a 3,3,4,4-tetrafluoro-2,2-dihalocyclobutanone is reacted with an aromatic hydrocarbon in the presence of conventional Friedel-Crafts catalysts, or with a hydroxy- or halo-substituted aromatic hydrocarbon, in which case no catalyst is necessary. With the more reactive systems, the reaction is spontaneous and exothermic. In other cases, a reaction temperature in the range of 75–200° C. is suitable.

(4) The bis-fluoroalkylaryl-, hydroxyaryl-, -haloaryl or hydroxyhaloaryl carbinols, i.e., the compounds of Formula I, where R and A are fluoroalkyl radicals as defined and R' is aryl, hydroxyaryl, haloaryl, or hydroxyhaloaryl. These compounds can be prepared by the methods described in application Serial No. 107,296, filed on May 3, 1961, by D. C. England. In these methods, the appropriate di(fluoroalkyl)ketone is condensed with the appropriate aromatic reactant in the presence of the usual Friedel-Crafts catalysts, at moderate temperatures in the range of 50–150° C.; or the di(fluoroalkyl)ketone is reacted with an arylmagnesium bromide in anhydrous ether, at temperatures which may be as low as −50° C. and generally need not exceed room temperature.

(5) The bis(ω-hydroperfluoroalkyl)carbinols, i.e., the compounds of Formula I, where R and R' are ω-hydroperfluoroalkyl groups and A is hydrogen. These compounds can be prepared by the process described in U.S. Patent 3,022,356, which consists in (a) telomerizing tetrafluoroethylene and methanol as described in U.S. Patent 2,558,628; (b) esterifying the primary alcohols present in the reaction mixture with a carboxylic acid or anhydride; and (c) distilling the resulting reaction mixture to separate the bis-(ω-hydroperfluoroalkyl)carbinols from the esters of the primary alcohols.

(6) The polyfluoro-1,2,-glycols, i.e., the compounds of Formula I, where A=H and R'=—CHOH—R. These compounds can be made, as described in U.S. Patent 3,012,069, by catalytic hydrogenation of the enediol esters of the formula

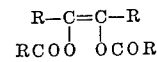

themselves obtained by reaction of the appropriate polyfluoroacyl chloride with nickel carbonyl in benzonitrile at temperatures below 40° C.

(7) The hydrates, bis-hemiketals and hydrate-hemiketals of perfluorocyclyobutane-1,2-dione (the products of Formula III). These compounds are made, as described in application Serial No. 29,188, filed by D. C. England on May 16, 1960, by direct addition of the stoichiometric amount of water and/or an alcohol to perfluorocyclobutane-1,2-dione. This cyclic diketone is prepared by hydrolysis with concentrated sulfuric acid of a perfluorocyclobutane-1,2-diether of the formula

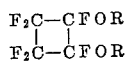

where R is a hydrocarbon radical, these diethers being themselves prepared by thermal cycloaddition of a perfluorovinyl hydrocarbyl ether CF₂=CFOR.

For illustrative purposes, a number of representative specific polyfluoroalcohols suitable for use in the compositions of this invention are listed below by name and formula:

2H-hexafluoro-2-propanol

2H-decafluoro-2-pentanol

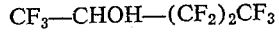

4H-tetradecafluoro-4-heptanol

3H-tetradecafluoro(2,4-dimethyl-3-pentanol)

1,3-dichloro-1,1,3,3-tetrafluoro-2-propanol

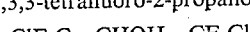

1H,3H,7H-dodecafluoro-3-heptanol $$H(CF_2)_2-CHOH-(CF_2)_4H$$

1H,5H,9H-hexadecafluoro-5-nonanol $$H(CF_2)_4-CHOH-(CF_2)_4H$$

Perfluoro(2,2-propanediol)

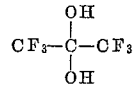

1,3-dichloro-1,1,3,3-tetrafluoro-2,2-propanediol

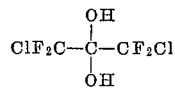

1,1,3-trichloro-1,3,3-trifluoro-2,2-propanediol

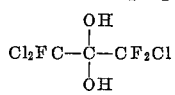

1,1,3,3-tetrachloro-1,3-difluoro-2,2-propanediol

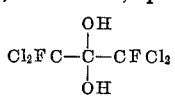

Perfluoro(3,3-pentanediol)

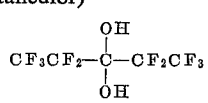

1,1,3,3-tetrafluoro-2,2-propanediol

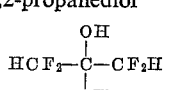

1H,5H-octafluoro-3,3-pentanediol

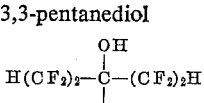

1H,13H-tetracosafluoro-7,7-tridecanediol

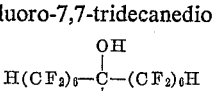

Perfluoro(7,7-tridecanediol)

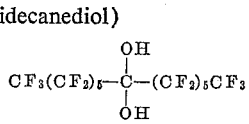

1,5-dichlorooctafluoro-3,3-pentanediol

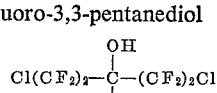

4-ethyltetradecafluoro-4-heptanol

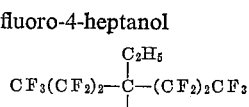

4-propyltetradecafluoro-4-heptanol

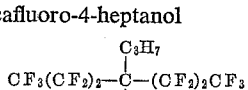

Perfluoro(2-methyl-2-propanol)

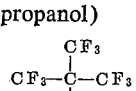

Perfluoro(4-methyl-4-heptanol)

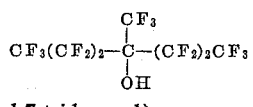

Perfluoro(7-hexyl-7-tridecanol)

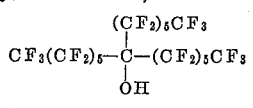

3H-dodecafluoro(2,3-dimethyl-2-butanol)

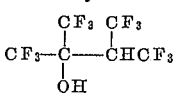

1H,13H-7-(6H-dodecafluorohexyl)-tetracosafluoro-7-tridecanol

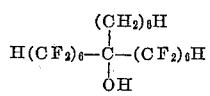

1,7-dichloro-4-(3-chlorohexafluoropropyl)dodecafluoro-4-heptanol

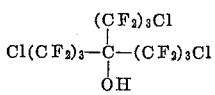

2-phenylhexafluoro-2-propanol

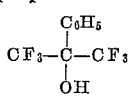

2-p-ethylphenylhexafluoro-2-propanol

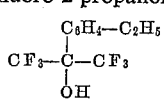

1H,7H-3-[α-(β-hydroxynaphthyl)]dodecafluoro-3-heptanol

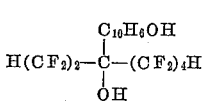

1,3-dichloro-1,1,3,3-tetrafluoro-2-(p-chlorophenyl)-2-propanol

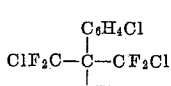

1,3-dichloro-1,1,3,3-tetrafluoro-2-(p-hydroxyphenyl)-2-propanol

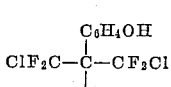

1,1-bis(chlorodifluoromethyl)-2-propyn-1-ol

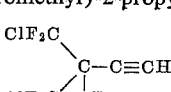

1,1-bis(trifluoromethyl)-2-propyn-1-ol

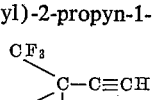

1,1,4,4-tetrakis(chlorodifluoromethyl)-2-butyn-1,4-diol

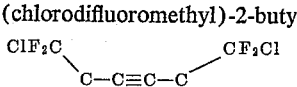

1,1-bis(chlorodifluoromethyl)-3-phenyl-2-propyn-1-ol

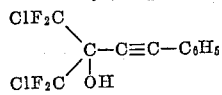

1,1,4,4-tetrakis(ω-hydroperfluoroethyl)-2-butyn-1,4-diol $$[H(CF_2)_2]_2\underset{OH}{C}-C\equiv C-\underset{OH}{C}[(CF_2)_2H]_2$$

m-Bis-(2-hydroxyhexafluoroisopropyl)benzene

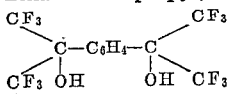

Perfluoro(2,3-dimethyl-2,3-butanediol)

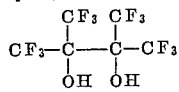

Perfluoro(2,2,3,3-butanetetrol)

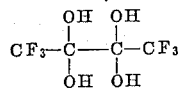

4H,5H-tetradecafluoro-4,5-octanediol $$CF_3(CF_2)_2-CHOH-CHOH-(CF_2)_2CF_3$$

5H,6H,1,10-dichlorohexadecafluoro-5,6-decanediol $$Cl(CF_2)_4-CHOH-CHOH-(CF_2)_4Cl$$

1H,7H,8H,14H-tetracosafluoro-7,8-tetradecanediol $$H(CF_2)_6-CHOH-CHOH-(CF_2)_6H$$

Perfluoro(1,1-cyclobutanediol)

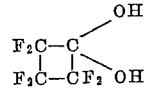

2-chloro-2,3,3,4,4-tetrafluoro-1,1-cyclobutanediol

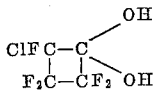

2,2-dichloro-3,3,4,4-tetrafluoro-1,1-cyclobutanediol

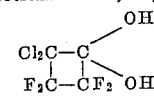

1-phenylhexafluorocyclobutanol

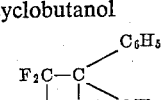

1-(p-chlorophenyl)hexafluorocyclobutanol

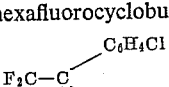

1-(3,4-dichlorophenyl)hexafluorocyclobutanol

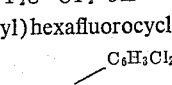

1-(p-hydroxyphenyl)-2,2-dichlorotetrafluorocyclobutanol

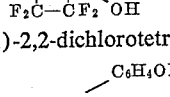

1-methoxyhexafluorocyclobutanol

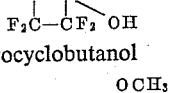

1-ethoxy-2-chloro-2,3,3,4,4-pentafluorocyclobutanol

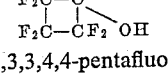

1,1,2,2-tetrahydroxy-3,3,4,4-tetrafluorocyclobutane

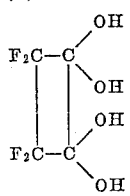

1,2-dihydroxy-1,2-dimethoxy-2,2,3,3-tetrafluorocyclobutane

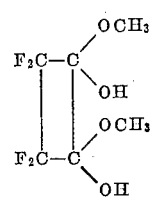

1,1,2-trihydroxy-2-ethoxy-3,3,4,4-tetrafluorocyclobutane

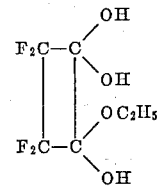

Most of the polyfluoroalcohols defined by Formulas I, II, and III are liquids at ordinary temperature. Others are solids with relatively low melting points. Such solids, however, are suitable for use in the compositions of this invention since, at or slightly above their melting points, they disperse or dissolve pigmentary organic materials to give macroscopically homogeneous, stable compositions. These compositions may solidify on cooling to solid dispersions or solutions which can be reliquefied readily on gentle warming. Furthermore, the normally solid polyfluoroalcohols can be used in admixture with liquid polyfluoroalcohols, or with other organic liquids miscible therewith, to give dispersions which remain liquid at ordinary temperature. These additional organic liquids may have but limited solubilizing power, or even none at all, toward the pigmentary material, provided there is enough of the polyfluoroalcohol to keep the dye or pigment in a dispersed or dissolved state. Also, some polyfluoroketone hydrates (gem-diols) are capable of forming more or less well defined higher hydrates containing from about 0.5 to about 1.5 moles or sometimes up to 10 moles of additional water. These higher hydrates are liquid at room temperature or below and they are suitable for the purposes of this invention.

The pigmentary materials used in the compositions of this invention can be any of the solid organic colorants used technically as dyes and pigments. The term "organic colorants" refers to products consisting of, or containing in substantial amount, a colored ingredient which is organic in nature. Of course, as is well known, many organic colorants contain metal atoms present in salt groups or chelate groups; others are used technically as complexes with inorganic materials, such as the "lakes" formed on aluminum hydroxide, phosphotungstic acid or phosphomolybdic acid, or the stabilized complexes formed by certain dyes with salts such as stannic chloride or zinc chloride.

Organic dyes and pigments are well known products, described and classified in many reference books, among which may be mentioned Lubs, "The Chemistry of Synthetic Dyes and Pigments" (Reinhold Publishing Corp., 1955), and Pratt, "Chemistry and Physics of Organic Pigments" (John Wiley & Sons, 1947). From the chemical standpoint, they belong to a variety of classes, the principal ones of which are listed below for reference. With each class is shown, by way of illustration, one or more representative examples of technically important dyes and pigments of that class. These specific dyes and pigments are listed under the names and reference numbers used in the Color Index, 2nd ed. (1956).

Azo, e.g., Direct Red 28, Direct Green 6, Acid Yellow 23, Disperse Yellow 3, Mordant Black 17, Pigment Red 1, Pigment Red 18, Pigment Red 50, Pigment Red 57.

Acridine, e.g., Basic Orange 14.

Azine, e.g., Basic Red 2, Solvent Black 5.

Ketone imine, e.g., Basic Yellow 2.

Methine, e.g., Disperse Yellow 31, Basic Yelow 11.

Nitro, e.g., Acid Yellow 1, Pigment Yellow 11, Disperse Yellow 1.

Nitroso, e.g., Acid Green 1.

Oxazine, e.g., Basic Blue 12, Direct Blue 109.

Quinoline, e.g., Acid Yellow 3.

Thiazine, e.g., Basic Blue 9.

Thiazole, e.g., Direct Yellow 28, Basic Yellow 1.

Triarylmethanes, e.g., Basic Green 4, Alkali Blue 110.

Xanthene, e.g., Acid Red 87, Pigment Red 81, Basic Violet 10.

Sulfur Dyes, e.g., Sulfur Blue 7, Sulfur Red 1.

Anthraquinone, e.g., Acid Blue 45, Acid Blue 78, Mordant Violet 26, Vat Yellow 2, Vat Orange 9, Vat Black 27, Vat Blue 6.

Indigoid, e.g., Vat Blue 5, Vat Violet 4, Vat Red 41, Vat Red 45.

Phthalocyanine, e.g., Pigment Blue 15, Pigment Blue 17, Direct Blue 86.

Quinacridone, e.g., the quinacridone pigments described in U.S. Patents 2,844,484; 2,844,485; and 2,844,581, and mixtures of these pigments.

As already noted, the invention is of particular value in the use of those organic colorants which are characterized by insolubility in water and substantial insolubility in organic solvents, the latter property being determined by a test with ethanol, a typical good solvent. Generally speaking, these insoluble colorants are those classified as organic pigments. Among the most useful compositions are those wherein the dispersed colorant is a phthalocyanine or a quinacridone pigment, since pigments of this type are notoriously difficult to obtain in the form of stable dispersions of fine particle size. Phthalocyanine pigments include the copper phthalocyanines, the various other metal phthalocyanines in which the combined metal is, for example, nickel, tin, iron, cobalt, chromium or manganese, and the metal-free phthalocyanines. The quinacridone pigments, which are described in the U.S. patents identified above, can be used in any of their several crystalline forms, or as mixtures thereof.

The liquid dispersing medium in the compositions of this invention is preponderantly organic, i.e., it contains organic ingredients in amounts of at least 55%, and preferably at least 80%, by weight, the inorganic ingredient, if any, consisting essentially of water. The amount of water that can be tolerated varies, of course, with the nature of the colorant. With easily dispersible or soluble dyes, much water can be present, up to about 45% by weight of the dispersing medium. With colorants, such as the organic pigments and certain classes of dyes, which are water-insoluble and poorly dispersible in most media, the amount of water present, if any, is generally under 20% by weight of the dispersing medium and, with the more intractable pigments such as those of the phthalocyanine or quinacridone class, even less water should be present. However, when, as will be discussed later, the composition also contains a polymeric material dissolved in the fluoroalcohol, the polymer often acts in the manner of a protective colloid and holds the solid colorant in the dispersed state in the presence of more water than could be tolerated otherwise.

Any water that may be present in the dispersions may be that supplied by the already mentioned higher hydrates of the gem-diols (fluoroketone hydrates), for example, the compound corresponding in composition to $(CF_3)_2C(OH)_2 \cdot \frac{1}{2}H_2O$. However, as discussed above, additional water may be present in amounts up to about 45% by weight of the total liquid dispersing medium. The polyfluoroalcohols suitable as dispersing agents are soluble in water, and many of them are soluble in all proportions.

The organic material may be solely a polyfluoroalcohol as defined, or a mixture of such polyfluoroalcohols, or it may contain in addition one or more organic liquids miscible therewith. The use of such additional organic diluents is often desirable, not only for economic reasons, but also for various technical reasons, for example, increased fluidity, lower solidification temperature or faster evaporation rate. However, the polyfluoroalcohol should be present in amounts of at least 15%, and preferably at least 50%, based on the total weight of the dispersing medium, in order to produce a satisfactory dispersion or solution of the dye or pigment. The organic diluent may be one which has little or no dispersing or solubilizing power for the colorant. Examples of suitable diluents include the aromatic hydrocarbons, e.g., benzene, toluene, the xylenes; aliphatic or cycloaliphatic hydrocarbons; halohydrocarbons, e.g., trichloroethylene, 1,1-chlorotetrafluoroethane; alcohols, e.g., ethanol, isopropyl alcohol, cyclohexanol, ethylene glycol, including primary fluoroalcohols such as those having the formula $$H(CF_2CF_2)_nCH_2OH$$

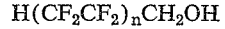

obtainable by telomerization of tetrafluoroethylene in the presence of methanol; ethers, e.g., methoxyethanol, 1,2-dimethoxyethane, tetrahydrofuran; oils such as those commonly used in paint formulations, e.g., linseed oil, tung oil; and the like.

The concentration of the colorant in the dispersing medium can vary over a wide range. Thus, it is possible to prepare highly concentrated stable dispersions, of pasty or semi-solid consistency, which in some cases may contain as much as 200% or even more of colorant by weight of the dispersing medium. On the other hand, dilute dispersions containing as little as 0.05% by weight of the colorant are useful for some purposes. In most cases, it is preferred that the dispersions contain from 0.1–50% of colorant, based on the weight of the dispersing medium.

The compositions can, of course, contain other ingredients such as antioxidants, corrosion inhibitors, ultraviolet light absorbers, filters, film-forming binders and other additives.

It has been found that the dispersibility in fluoroalcohols of pigments that are highly insoluble and especially difficult to disperse, specifically, the phthalocyanine and quinacridone pigments, is very markedly improved when the dispersing medium has an acidic reaction. More particularly, by far the finest and most stable dispersions of these pigments are obtained when the fluoroalcohol medium has an acidity corresponding to a pH between about 1 and 2, as determined, for example, by means of the usual pH-testing papers. At a pH higher than about 2, e.g., in the 2.5–5 range, dispersions of these insoluble pigments can still be readily formed, and such dispersions are satisfactory for at least some uses, but they are usually much less finely divided and uniform, and their storage stability is not nearly as good, as when the dispersing medium in the above-mentioned pH range of 1–2. However, excessive acidity, such as that corresponding to a pH range appreciably below 1, is to be avoided. With other colorants of a more tractable nature (i.e., with practically all pigments or dyes other than those mentioned) the pH of the fluoroalcohol medium appears to have much less influence, or even none at all in many cases, and excellent dispersions can be obtained whether or not the medium is acidic or neutral or even basic.

It so happens that many fluoroalcohols, particularly the polyfluoroketone hydrates, are usually inherently acidic in reaction unless they are subjected to special purification treatments. Frequently, their acidity, as they are normally obtained, is in the range corresponding to a pH of 1–2. In such cases, these fluoroalcohols can be used directly to form superior dispersions of highly insoluble pigments. However, this normal acidity is subject to variations from batch to batch. Also, it may be desirable for various reasons to deacidify the fluoroalcohols by special treatments, such as vapor phase chromatography or contact with an acid-absorbent such as sodium fluoride, or by addition of minute amounts of a base such as a tertiary amine. In such cases, the fluoroalcohol may have a pH value, for example, in the range of 4–5, which is undesirably high for the formation of high quality dispersions of phthalocyanine or quinacridone pigments. This condition can be remedied by adding to the flukoroalcohol sufficient acid to bring the pH down to the 1–2 range. Addition of acid is also useful, for example, to redisperse and stabilize a dispersion which shows signs of partial settling on standing.

The acid necessary to correct the pH of the fluoroalcohol dispersing medium can be added to the latter either before or after the pigment dispersion is prepared. For this purpose, use is made of an inorganic or organic acid, of a strength at least equal to that represented by a dissociation constant of $1 \times 10^{-4}$, which is miscible with water and with the fluoroalcohol being used. Suitable acids include, for example, sulfuric acid, hydrochloric acid, hydrofluoric acid, nitric acid, dichloroacetic acid, 1,1,2,2-tetrafluoroethanesulfonic acid, trifluoroacetic acid, difluoroacetic acid, 1,1,2,2-tetrafluoroethanecarboxylic acid, 1,1,2,2,3,3,4,4-octafluorobutanecarboxylic acid, perfluoropropanecarboxylic acid, etc. The acid should be added in amount just sufficient to bring the pH down to the desired range, between 1 and 2, this amount being generally very minute.

The acid can be added as such, i.e., without dilution, but it has been found that better results as regards the ultimate quality of the pigment dispersion are obtained when the acid is added as a dilute aqueous solution, preferably an aqueous solution containing from 1–10% of acid by weight. This mode of acidifying the fluoroalcohol dispersing medium is therefore preferred.

It will be apparent from the foregoing discussion that the invention also provides a method of improving the dispersibility of organic dyes and pigments in preponderantly organic media. This is achieved by intimately mixing the solid colorant with a polyfluoroalcohol of the class defined above. The latter may be used in amounts as low as 50% by weight of the colorant, to make a pasty or nearly solid dispersion. In some cases, presumably owing to the physical state or crystalline form of the solid colorant, thick pastes are obtained even at a weight ratio of fluoroalcohol to colorant as high as 95:5. The pastes can be used as such in certain applications or diluted with additional polyfluoroalcohol and/or an organic diluent, and if desired some water. Alternatively, the colorant may be mixed at once with the total amount of polyfluoroalcohol desired in the final composition, and an additional diluent may be added at the same time or later.

One of the advantages of this process lies in the fact that, owing to the superior dispersing or solubilizing power of the polyfluoroalcohols, very fine, stable dispersions of the dye or pigments are in many cases formed much more rapidly and easily than can be done with other vehicles. This difference is particularly marked in the case of insoluble colorants of the pigment type. Thus, mixing with a high speed stirrer is generally sufficient to obtain a satisfactory dispersion, or at most only mild grinding or milling is required. This is an important technical advantage since, as is known, prolonged working of a pigment is often detrimental to quality, in that over-grinding, for example, can cause serious loss of tinctorial strength. Furthermore, even under such mild conditions, the dispersed pigment is reduced to a very fine particle size, which is also an advantage since, with many pigments, some of the tinctorial strength and brightness is sacrificed when the particle size exceeds an optimum degree of fineness. These problems are particularly acute with phthalocyanine pigments, which normally require special treatment such as the so-called "acid pasting" to reduce their particle size to the desired degree.

The compositions of this invention can be used in any of the conventional procedures known in the art for dyeing substrates from essentially non-aqueous baths. Thus, contact between the substrate and the colorant dispersion can be effected by dipping, brushing, spraying, painting, etc. In the dyeing of substrates, several advantages result from the use of the above-defined polyfluoroalcohols as vehicles in comparison with other pigment or dye vehicles. First, dispersions can be obtained in which the particle size of the colorant is much finer than that previously obtainable. Thus, it is possible to convey the finely dispersed particles into pore structures such as metals, ceramics, concrete, etc., which are too small to allow penetration of larger particles. Second, the dispersions are highly stable, showing little or no tendency to separate or settle not only on standing but even under the influence of centrifugal forces many times that of gravity. A further and very important advantage lies in the fact that the fluoroalcohol vehicles have strong penetrating or swelling power for a wide variety of substrates such as paper, wood, regenerated cellulose, natural or synthetic fibers, leather, etc., with the result that intimate bonding of the colorant to the substrate is achieved. This valuable property will be discussed in somewhat greater detail later in connection with the dyeing of plastics. Moreover, the fluoroalcohols are characterized by low flammability or even resistance to combustion, with consequent decrease in the fire hazards normally present with organic solvents. A word of caution is indicated, however, since some fluoroalcohols, e.g., 1,3 - dichloro - 1,1,3,3 - tetrafluoro - 2,2 - propanediol and perfluoro-(2,3-dimethyl-2,3-butanediol), have toxic properties and should be handled with care.

In a specific embodiment of the invention, the colored compositions contain, dissolved in the polyfluoroalcohol vehicle, a substantially linear, high molecular weight synthetic polymer. It has been found that the products defined by Formulas I–III are capable of dissolving a wide variety of synthetic polymeric materials, even those polymers normally considered intractable and for which very few or no good solvents are available. It may be noted in this connection that the pH of the polyfluoroalcohol vehicle, discussed above with respect to the dispersibility of certain pigments, has no appreciable effect on the solubility of polymeric materials in these alcohols.

The principal synthetic linear polymers of high molecular weight (of the order of at least 3000) that are soluble in these polyfluoroalcohols are those which contain oxygen and/or nitrogen atoms attached to carbon atoms, and especially polymers containing ester, amide, acetal, ether, cyano or hydroxyl groups. Representative classes of such polymers include the following:

(1) The polyesters, i.e., the polymers containing the carbonyloxy group,

which may be intralinear of extralinear. These include the intermolecular condensation products of dibasic carboxylic acids such as carbonic, adipic, sebacic or terephthalic acids with glycols such as ethylene, hexamethylene or decamethylene glycols; the intramolecular condensation products of hydroxyacids such as hydroxypivalic acid or ω-hydroxycaproic acid; the polyesteramides; the polycarbamates (i.e., polyurethanes); the polymers of acrylic or methacrylic esters such as polymethyl methacrylate; the polymers of vinyl carboxylates such as polyvinyl acetate; etc.

(2) The polyamides, i.e., the polymers containing the carbonylamino group,

which may be intralinear or extralinear and may be present in various combinations, for example, in polyimides, polycarbamides (polyureas), polyoxamides, polyhydrazides or polybisureylenes. These include the intermolecular condensation products of dibasic carboxylic acids such as carbonic, adipic, sebacic or terephthalic acid with diamines such as hexamethylenediamine, decamethylenediamine or di(p-aminocylcohexyl)methane; the intramolecular condensation products of aminoacids such as 6-aminocaproic acid, 11-aminoundecanoic acid, leucine or 1-aminocyclohexanecarboxylic acid; the polymers containing both amido and urethane (carbamate) linkages; the polyimides from diprimary diamines and tri- or tetra-carboxylic acids having two carboxyl groups attached to adjacent carbon atoms; the polymers of acrylic or methacrylic amides; etc.

(3) The polyacetals, i.e., the polymers containing the acetal linkage,

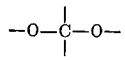

including the formaldehyde polymers; the condensation products of aldehydes and glycols such as polyhexamethylene formal; the polyvinyl acetals such as polyvinyl butyral; etc.

(4) The polyethers, i.e., the polymers containing the ether linkage

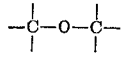

which may be intralinear, as in the condensation products of glycols or dihydric phenols and dihalides, or extralinear, as in the polymers of alkylvinyl ethers.

(5) The polymers containing cyano groups, especially the acrylonitrile polymers containing at least 85% by weight of polymerized acrylonitrile, and the corresponding alkylacrylonitrile polymers such as polymethacrylonitrile.

(6) The polymers containing hydroxyl groups, especially the hydrolyzed vinyl carboxylate homopolymers (i.e., the polyvinyl alcohols) and the hydrolyzed vinyl carboxylate/ethylene copolymers wherein the ratio of vinyl carboxylate units to ethylene units is between 1:5 and 50:1, the degree of hydrolysis in said hydrolyzed polymers being at least 80%.

The preferred polymers for use in the compositions of this invention are the polyesters and polyamides wherein the carbonyloxy or carbonylamino groups are intralinear; the formaldehyde polymers, and the acrylonitrile polymers.

Colored compositions containing a polymer dissolved therein can be used as paints, the polymer serving as the film-forming binder for the colorant. Such paints can be applied to any porous or non-porous surfaces. The polymer-containing colored compositions can also be used to form directly and in one operation dyed, shaped structures such as filaments, films or molded objects of the dissolved polymer. This is accomplished simply by extruding, casting or molding the fluoroalcohol/polymer/colorant composition and subsequently evaporating or otherwise removing the fluoroalcohol and any other volatile material present, whereby the dye or pigment particles remain uniformly and intimately dispersed throughout the shaped polymer structure.

As already mentioned, an important aspect of this invention is the surface dyeing of plastics. The production of colored surfaces on plastics is a problem which has not been satisfactorily solved by the usual painting procedures, primarily because the conventional paint solvents or vehicles do not actively etch the plastic surfaces to be painted. As a result, colored coatings on many plastic surfaces have poor adhesion and are easily removed by rubbing or scratching. In order to overcome this drawback, it has been necessary to resort to expensive preliminary treatments of the plastic surfaces, such as sand blasting, priming or solvent etching.

These disadvantages are avoided when use is made of the pigmented compositions of this invention. Because of the exceptional solvent power of the fluoroalcohol vehicles for a large number of plastic materials, superficial etching or swelling occurs rapidly and the dye or pigment present becomes actually bonded into the surface. There is thus obtained a truly adherent colored layer which strongly resists washing or mechanical actions such as scratching or rubbing. This desirable effect is also achieved, and may even be reinforced, when the colored composition also contains dissolved therein a polymeric material, as described above, which contributes a sealing action and helps bond the colorants onto the surface. The dissolved polymer need not be of the same chemical nature as the polymer surface being painted, but better results with respect to adhesion of the colored coating are generally obtained when this is the case.

Any plastic material which is attacked or at least swelled by the fluoroalcohol dispersing medium can be painted with good results. The plastic, for example, can be any of the synthetic linear polymers mentioned above as being soluble in the fluoroalcohols defined by Formulas I–III, or it can be a material, such as for example regenerated cellulose which, while not appreciably soluble, is swelled to some extent by these fluoroalcohols. The plastic can be in any desired shape, such as fibers, rods, tubes, films, molded objects, and the like. The plastic surface can be colored by any of the usual techniques such as dipping, brushing, spraying or printing, and the application time needs only be long enough to effect attack of the surface, which is normally a very short time because of the powerful solvent action of the fluoroalcohols even at ordinary temperature. The volatile materials, including the fluoroalcohol solvent, are then removed by any suitable method, preferably by evaporation at ordinary or elevated temperature, or if desired by washing with water or an inert organic solvent.

Plastics colored by this method are new products, since they differ from previously known dyed materials where the colorant is merely superficially absorbed, i.e., held in surface pores, or contained in a discrete binder layer such as a conventional paint.

The following examples illustrate the invention in greater detail.

*Example 1*

Dispersions were prepared of the phthalocyanine pigment having Color Index No. 74160 (Pigment Blue 15) in 1,3-dichloro - 1,1,3,3 - tetrafluoro - 2,2 - propanediol, $(ClF_2C)_2C(OH)_2$, and in perfluoro(2,2-propanediol) one-half hydrate (i.e., the product, containing approximately 5% of water, corresponding in composition to $(CF_3)_2C(OH)_2 \cdot \frac{1}{2}H_2O$, by vigorously stirring the pigment into the fluoroalcohol while warming to about 95° C. The concentration of pigment in these dispersions was 5 g. in 100 ml. of fluoroalcohol. The fluoroalcohols had not been subjected to any acid-removing treatment prior to use, and their acidity was estimated to be that corresponding to a pH of 1–2. Dispersions of superior quality were obtained in both media as shown by the following tests:

(a) A drop of dispersion applied to filter paper spread readily through the paper with the color migrating through the limit of penetration of the liquid vehicle, indicating excellent uniformity of the dispersion.

(b) Examination under the microscope at a magnification of 60× showed no visible particles.

(c) The pigment showed only slight tendency to settle out on prolonged standing.

(d) The pigment did not separate on centrifuging the dispersions for periods of from 15 minutes to 24 hours using forces varying from 1000 to 30,000 times the force of gravity.

In contrast, dispersions of the same pigment prepared in the same manner in non-fluorinated alcohols such as tetrahydrofurfuryl alcohol, cyclohexanol or benzyl alcohol showed separation of the pigment on standing for one of two days, or on centrifuging for 1-2 hours at 1000 times gravity.

The same pigment was dispersed at 1% concentration in the same vehicles by mechanically shaking 0.1 g. of pigment in 10 g. of the fluoroalcohol at room temperature. Both dispersions were of excellent quality, as shown by the previously described tests.

*Example 2*

The dispersibility of the phthalocyanine pigment of Example 1 was tested in different lots of 1,3-dichloro-1,1,3,3-tetrafluoro-2,2-propanediol, whose approximate pH values were determined by means of hydrogen ion-testing paper. These tests showed that, when the pH of the dispersant was about 1, an excellent dispersion was obtained; at pH 2 or somewhat above, the dispersibility, while adequate, was not outstanding; and, when the dispersant was deacidified to pH 4.5–5 by addition of 1% of triethylamine, the dispersibility became definitely poor.

The effect of acidity on the same solvent/pigment system was further demonstrated as follows: A dispersion was prepared by vigorously shaking and gently warming the propanediol containing 10 mg. of the pigment per milliliter of the fluoroalcohol (pH approximately 2). This dispersion was satisfactory but not outstanding, as judged by its ability to diffuse through filter paper. On addition to 1 ml. of the dispersion of about 0.1 g. of concentrated sulfuric acid there was temporary precipitation of the pigment but on subsequent addition of about 0.1 g. of water the pigment redispersed and the dispersion was markedly improved, as shown by diffusion through filter paper. The same improvement, but without temporary precipitation, was obtained by adding to 1 ml. of the original dispersion about 0.05 g. of 10% aqueous sulfuric acid or about 0.05 g. of 5% aqueous hydrofluoric acid. These dispersions remained stable for at least 24 hours.

In another series of tests, a dispersion at 0.5% concentration by weight of the same pigment in the same solvent was prepared. This dispersion, which initially was not of outstanding quality, was markedly improved by addition, to 1 ml. portions in each case, of:

(a) About 0.05 g. of 5% aqueous sulfuric acid. This turned the blue color to green.

(b) About 0.05–0.10 g. of 10% aqueous trifluoroacetic acid. This also produced a green color.

(c) About 0.05 g. of 5% aqueous nitric acid. This produced an excellent dispersion, whose color had turned from blue to red-brown.

(d) About 0.05 g. of 10% aqueous 1,1,2,2-tetrafluoroethanesulfonic acid. This gave an excellent, intense blue dispersion.

(e) About 0.05 g. of 10% aqueous trichloroacetic acid. This improved the dispersion, but to a lesser extent than the other acids.

*Example 3*

A highly insoluble quinacridone pigment was stirred with samples, at various pH, of 1,3-dichloro-1,1,3,3-tetrafluoro-2,2-propanediol. Each of the resulting compositions contained 10 mg. of pigment per milliliter of dispersant. After standing for 2–3 hours, each composition was tested for diffusion on filter paper and was examined for the presence of visible particles under the microscope at 420 magnification.

(a) At pH approximately 2, the product had more the character of a suspension than of a fine dispersion. Diffusion of color through filter paper was poor, and the microscope showed the presence of many finely divided particles.

(b) At pH approximately 1, the product was an extremely fine red-purple solution or dispersion which diffused readily through filter paper and showed very few particles under the microscope.

(c) When 1% of triethylamine was added to the dispersant used in (a) above to neutralize its acidity, the product was not a dispersion, or at best a poor one, since it did not diffuse through filter paper and showed the presence of many pigment aggregates.

(d) When 5% by weight of 5% aqueous hydrogen fluoride was added to the dispersant of (a) above, the product was an excellent purple dispersion or solution similar to that obtained in (b). It spread well through filter paper and showed no visible particles under the microscope.

It may be mentioned that similar acidification of non-fluorinated alcohols does not make them good dispersants for pigments. Thus, when amounts of 5% aqueous hydrochloric acid ranging from about 0.05 g. to 0.5 g. were added to 2 ml. portions of a suspension of the same quinacridone pigment (about 2.5% by weight) in cyclohexanol or tetrahydrofurfuryl alcohol, there was no indication that the acid helped to peptize the pigment, and the suspensions remained of very inferior quality. In contrast, addition of one drop of 5% hydrochloric acid to 2 ml. of 1,3-dichloro-1,1,3,3-tetrafluoro-2,2-propanediol containing 0.05 g. of the same quinacridone pigment produced an excellent red-purple dispersion which diffused readily through filter paper.

*Examples 4–10*

Dispersions were prepared by stirring or shaking at room temperature the phthalocyanine pigment of Example 1 in the fluoroalcohols and at the concentrations, in weight percent, shown in the following table. The pH of the fluoroalcohols was not determined. It was apparently in a favorable range since all dispersions of this highly insoluble pigment were of satisfactory quality.

| Example | Fluoroalcohol | Pigment concentration, percent |
|---|---|---|
| 4 | $F_2C-C(OH)(OH)$ bridged to $F_2C-CF_2$ ; +10% water | 3 |
| 5 | $H(CF_2)_2-C(OH)(OH)-(CF_2)_2H$ | 1 |
| 6 | $(CF_3)_2C(OH)-C(OH)(CF_3)_2$ | 1 |
| 7 | $F_2C-C(OH)(OH)$ bridged to $F_2C-C(OH)(OH)$ ; +20% water | 1 |
| 8 | $CF_3-CHOH-CF_3$ | 1 |
| 9 | $ClF_2C-CHOH-CF_2Cl$ | 1 |
| 10 | $CF_3-C(C_6H_5)(OH)-CF_3$ | 1 |

These dispersions were used to dye paper a deep, uniform blue color, as well as other materials. For example, the dispersion of Example 4 was used to paint the surface of an alkyd resin varnish with very good results.

The perfluoro(2,3-dimethyl-2,3-butanediol), or perfluoropinacol, of Example 6 can be prepared by irradiation with ultraviolet light of a mixture of hexafluoroacetone and a primary or secondary alcohol, e.g., isopropyl alcohol. The resulting reaction product is an addition complex from which the perfluoropinacol can be recovered by distillation from concentrated sulfuric acid. It boils at 129° C. and melts at 26° C.

*Example 11*

Further tests on the effect of added acid on dispersions in various fluoroalcohols of the extremely insoluble phthalocyanine and quinacridone pigments were conducted as follows:

Dispersions were prepared of the phthalocyanine pigment C.I. 74160 in the fluoroalcohols listed below. The dispersions contained 0.02 g. of pigment per milliliter of dispersant.

Fluoroalcohols:

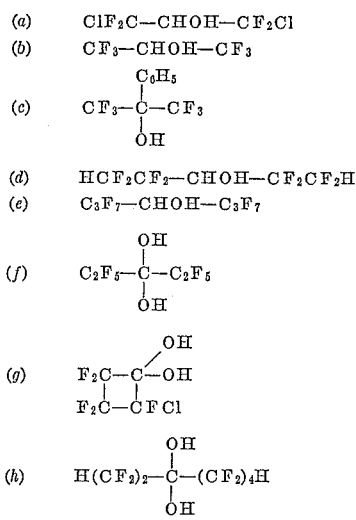

These dispersions were of satisfactory quality as prepared, except for dispersions (*e*), (*f*) and (*g*), which were rather poor.

To 1 ml. of each dispersion was added about 0.01 g. of anhydrous trifluoroacetic acid in one series of tests, and the same amount of trifluoroacetic acid in about 10% aqueous solution in another series of tests. The acidified dispersions and the control, non-acidified dispersions were tested, after thorough shaking and warming to about 80° C. by applying a drop to filter paper and observing the spreading of the blue or green color through the paper. An improvement, in some cases quite appreciable, was observed in all the acidified dispersions as compared with the controls. It was further observed that the improvement was greater with the dilute acid than with the anhydrous acid.

Similar results were noted when about 0.05 g. of 10% aqueous trifluoroacetic acid was added to 1 ml. each of dispersions of a quinacridone pigment in fluoroalcohols (*b*) and (*c*) of the above list.

*Examples 12–15*

The pigments identified in the following table were stirred with 1,3-dichloro-1,1,3,3-tetrafluoro-2,2-propanediol, the pigments being used at a concentration of about 5 g. of pigment in 100 ml. of the fluoroalcohol. In all cases, clear solutions (molecular or near-molecular dispersions) of the colorant formed readily at room temperature.

| Example | Pigment |
|---|---|
| 12 | Pigment Yellow 1 (C.I. 11680), an azo dye. |
| 13 | Pigment Violet 1, the tungstic-molybdic acid lake of the xanthene dye C.I. 45170. |
| 14 | Pigment Green 8 (C.I. 10006), a nitroso dye. |
| 15 | Pigment Red 3 (C.I. 12120), an azo dye. |

These dispersions were used to dye paper and other substrates with excellent results. For example, the solution of Example 15, at 1% solids content, was brushed onto the surface of a piece of nylon plastic to form an attractive, adherent colored surface.

*Examples 16–17*

The pigments identified below were stirred in amounts of 5 g. in 100 ml. of solvent with the half-hydrate of perfluoro(2,2-propanediol) at room temperature. Clear solutions were obtained in both cases. These solutions produced excellent dyeings of paper.

| Example | Pigment |
|---|---|
| 16 | Pigment Yellow 12 (C.I. 21090), an azo dye. |
| 17 | Pigment Red 48 (C.I. 15865), an azo dye. |

*Examples 18–31*

Each of the dye or pigment listed in the table below was placed in contact at room temperature with two different fluoroalcohols: 1,3-dichloro-1,1,3,3-tetrafluoro-2,2-propanediol and 2H-hexafluoro-2-propanol, the colorant being used in amount of 1% by weight of the fluoroalcohol. Dispersion or solution took place in both vehicles in each case although, under these very mild conditions, some of the colorants did not completely dissolve at the concentration used. The dye solutions or dispersions were applied onto cotton poplin and/or wool gabardine and the solvent was removed by evaporation in the air at room temperature. A test of wash fastness was made by immersing the dyed fabrics in a 1% aqueous solution of a commercial detergent for 15 minutes at 95–100° C. for cotton and 60–70° C. for wool, followed by a rinse in warm water and drying in air at room temperature. Even though no attempt was made to determine and use optimum dyeing procedures, the wash fastness was good or satisfactory in almost all cases.

| Example | Dye | Dye Class |
|---|---|---|
| 18 | Solvent Black 5 (C.I. 50415) | Azine. |
| 19 | Pigment Red 81 (C.I. 45160) | Xanthene. |
| 20 | Basic Yellow 2 (C.I. 41000) | Ketone imine. |
| 21 | Basic Yellow 11 (C.I. 48055) | Methine. |
| 22 | Acid Yellow 1 (C.I. 10316) | Nitro. |
| 23 | Basic Blue 9 (C.I. 52015) | Thiazine. |
| 24 | Basic Yellow 1 (C.I. 49005) | Thiazole. |
| 25 | Basic Green 4 (C.I. 42000) | Triarylmethane. |
| 26 | Disperse Red 15 (C.I. 60710) | Anthraquinone. |
| 27 | Vat Black 27 (C.I. 69005) | Anthraquinone, vat. |
| 28 | Vat Green 1 (C.I. 59825) | Do. |
| 29 | Vat Blue 1 (C.I. 73000) | Indigoid. |
| 30 | Acid Blue 158 (C.I. 14880) | Chrome. |
| 31 | Acid Dye (C.I. 11700) | Half-chrome. |

In a separate series of tests, all of the dyes or pigments tabulated above were again mixed with the same two fluoroalcohols. The initial pH of both solvents was approximately 4.5. Dispersion or solution took place in both vehicle in each case although again, under the mild conditions used, a few of the colorants did not dissolve completely. Each dispersion or solution was then treated with sufficient dilute hydrochloric acid to bring the pH down to 1–1.5. In general, acidification produced no significant increase in the dispersibility of these colorants, which are intrinsically less difficult to disperse than the intractable pigments of the phthalocyanine or quinacridone types. In some cases, however (the colorants of Examples 22, 26, 28, 29 and 30), a difinite improvement with respect to dispersibility was noted in one or both of the fluoroalcohol solvents employed.

The following examples (Examples 32–36) illustrate the embodiment of the invention where a high molecular weight synthetic linear polymer is dissolved in the fluoroalcohol/colorant composition.

*Example 32*

The anthraquinone vat dye C.I. 59825 (Vat Green 1) was dissolved at 1% concentration in 1,3-dichloro-1,1,3,3-tetrafluoro-2,2-propanediol by warming at about 95° C. This solution was added, in a ratio by volume of about 1:10, to a 10% solution of a commercial high molecular weight polyethylene terephthalate in the same solvent. The dye/polymer solution was cast onto a glass plate and the solvent was evaporated at room temperature, leaving a deeply and uniformly dyed film of polyethylene terephthalate.

*Example 33*

A 1% dispersion of the phthalocyanine pigment C.I. 74160 in 1,3-dichloro-1,1,3,3-tetrafluoro-2,2-propanediol was added, in a ratio by volume of about 1:10, to two solutions each containing 10% by weight of a high molecular weight polymer in the same solvent. The polymers were polyethylene terephthalate and polyhexamethyleneadipamide, respectively. The pigmented polymer solutions were spread on glass plates and the solvent was evaporated at room temperature. Tough, nearly transparent films dyed a uniform blue color were obtained.

*Example 34*

A dispersion of the phthalocyanine pigment C.I. 74160 in perfluoro(2,2-propanediol) half-hydrate (about 5% solids content) was added to a 1% solution of a commerical high molecular weight formaldehyde polymer in the same solvent in an amount such that the final solution contained approximately 0.1% by weight of pigment. The pigmented polymer solution was applied to sheet steel and sheet aluminum to form hard, adherent colored coatings.

*Example 35*

One part by volume of a 1% dispersion of the phthalocyanine pigment C.I. 74160 in 1,3-dichloro-1,1,3,3-tetrafluoro-2,2-propanediol was added to 10 parts by volume of a 1% solution of a commercial high molecular weight polyhexamethyleneadipamide in a mixed solvent consisting of, by weight, 60% of the same fluoroalcohol and 40% of benzene. The resulting solution was used to form hard, adherent colored coatings on sheet steel and sheet aluminum.

*Example 36*

A solution was prepared containing, by weight, 0.36% of commercial polyhexamethyleneadipamide and 2.8% of a red dye (organic salt of the dye C.I. 27290) in a mixture of 70% of $(CF_3)_2C(OH)_2 \cdot \frac{1}{2}H_2O$ and 30% of water. A piece of suede leather was immersed in this solution at 45–50° C. for 15 seconds and the excess solution was immediately removed by squeezing the leather under a roller between pieces of absorbent paper, after which the leather was washed with water and dried. The leather was well and uniformly dyed.

The following examples (Examples 37–41) illustrate the dyeing of plastics with the compositions of this invention.

*Example 37*

A piece of commercial polyformaldehyde plastic was dipped for about 30 seconds in a dispersion (concentration 0.2% by weight) of the phthalocyanine pigment C.I. 74160 in 1,3-dichloro-1,1,3,3-tetrafluoro-2,2-propanediol, and the solvent was then removed by evaporation at room temperature. The resulting blue coating adhered strongly to the plastic and could not be removed by rubbing or by scrubbing with soap and water.

*Example 38*

The procedure of Example 37 was repeated using a 0.2% solution of the vat dye C.I. 69800 (Vat Blue 4) in perfluoro(2,2-propanediol) one-half hydrate. The resulting colored coating had excellent adhesion.

*Example 39*

A solution was prepared containing, by weight, 1% of a commercial formaldehyde polymer and 0.1% of the pigment C.I. 74160 in a solvent mixture consisting of 10 parts of 1,3-dichloro-1,1,3,3-tetrafluoro-2,2-propanediol and 3 parts of benzene by weight. A piece of commercial polyformaldehyde plastic was dipped in this solution for about 30 seconds. After removing the solvent by evaporation at room temperature, a colored coating was produced that could not be rubbed or washed off the plastic.

*Example 40*

Example 39 was repeated except that the dissolved polymer was a commercial polyhexamethyleneadipamide and that the solution was applied to the plastic by brushing. The coating showed a uniform color and good adhesion to the substrate.

*Example 41*

A solution was prepared containing, by weight, 2% of a commercial polyacrylonitrile and 0.3% of the pigment C.I. 74160 in perfluoro(2,2-propanediol) one-half hydrate. This solution was applied by brushing on a polyformaldehyde plastic to produce an adherent blue coating.

Since obvious modification and equivalents in the invention will be evident to those skilled in the chemical arts, I propose to be bound solely by the appended claims.

The embodiments of the invention in which an exclusive property or privilege is claimed are defined as follows:

1. A stable dispersion of a normally solid organic colorant in a liquid dispersing medium which comprises at least 55% by weight of organic ingredients and which contains at least 15% by weight of a polyhaloalcohol wherein all halogens are of atomic number 9–17 selected from the group consisting of (I) 

(II) 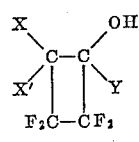

and (III) 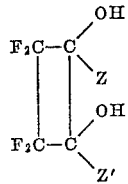

wherein:
(1) R is selected from the group consisting of fluoroperhalomethyl, difluoromethyl and perfluoroalkyl, ω-hydroperfluoroalkyl and ω-chloroperfluoroalkyl of 2–6 carbons; (2) R' is selected from the group consisting of R and hydrocarbon, halohydrocarbon, hydroxyhydrocarbon and halohydroxyhydrocarbon of 1–10 carbons; (3) and A is selected from the group consisting of hydrogen hydroxyl and R, with the proviso that the polyhaloalcohol (I) contains at least two members of the group defined under (1) attached to hydroxyl-bearing carbon; (4) X and X' are halogen; (5) Y is selected from the group consisting of hydroxyl, phenyl, halophenyl, hydroxyphenyl and alkoxy of 1–2 carbons; and (6) Z and Z' are selected from the group consisting of hydroxyl and alkoxy of 1–2 carbons.

2. A dispersion of claim 1 in which the liquid dispersing medium contains up to 20% by weight of water.

3. A dispersion of claim 1 containing additionally a substantially linear high molecular weight synthetic polymer.

4. A dispersion of claim 1 wherein the polyhaloalcohol is 1,3-dichloro-1,1,3,3-tetrafluoro-2,2-propanediol.

5. A dispersion of claim 1 wherein the polyhaloalcohol is perfluoro(2,2-propanediol) one-half hydrate.

6. A dispersion of claim 1 wherein the polyhaloalcohol is perfluorocyclobutanediol-1,1.

7. A dispersion of claim 1 wherein the polyhaloalcohol is α,ω-dihydroperfluoroheptanediol-3,3.

8. A dispersion of claim 1 wherein the polyhaloalcohol is 2H-hexafluoro-2-propanol.

9. A dispersion of claim 1 wherein the pH is between about 1 and 2.

10. A dispersion of claim 9 wherein the organic colorant is a phthalocyanine pigment.

11. A dispersion having a pH between about 1 and 2 comprising a phthalocyanine pigment dispersed in a liquid dispersing medium at least 80% by weight of which is organic and at least 50% by weight of which is 1,3-dichloro-1,1,3,3-tetrafluoro-2,2-propanediol.

12. A dispersion having a pH between about 1 and 2 comprising a phthalocyanine pigment dispersed in a liquid dispersing medium at least 80% by weight of which is organic and at least 50% by weight of which is perfluoro(2,2-propanediol) one-half hydrate.

13. A dispersion having a pH between about 1 and 2 comprising a phthalocyanine pigment dispersed in a liquid dispersing medium at least 80% by weight of which is organic and at least 50% by weight of which is perfluorocyclobutanediol-1,1.

14. A dispersion having a pH between about 1 and 2 comprising a phthalocyanine pigment dispersed in a liquid dispersing medium at least 80% by weight of which is organic and at least 50% by weight of which is α,ω-dihydroperfluoroheptanediol-3,3.

15. A dispersion having a pH between about 1 and 2 comprising a phthalocyanine pigment dispersed in a liquid dispersing medium at least 80% by weight of which is organic and at least 50% by weight of which is 2H-hexafluoro-2-propanol.

16. A dispersion of claim 9 wherein the organic colorant is a quinacridone pigment.

17. A dispersion having a pH between about 1 and 2 comprising a quinacridone pigment dispersed in a liquid dispersing medium at least 80% by weight of which is organic and at least 50% by weight of which is 1,3-dichloro-1,1,3,3-tetrafluoro-2,2-propanediol.

18. A dispersion having a pH between about 1 and 2 comprising a quinacridone pigment dispersed in a liquid dispersing medium at least 80% by weight of which is organic and at least 50% by weight of which is 2H-hexafluoro-2-propanol.

19. A dispersion of claim 1 wherein the organic colorant is an azo dye.

20. A dispersion of claim 1 wherein the organic colorant is a nitroso dye.

21. A dispersion of claim 1 wherein the organic colorant is an anthraquinone dye.

References Cited in the file of this patent

UNITED STATES PATENTS

| | | |
|---|---|---|
| 2,559,628 | Joyce | July 10, 1951 |
| 2,568,500 | Husted | Sept. 18, 1951 |
| 2,666,797 | Husted | Jan. 19, 1954 |
| 2,700,685 | Dickey | Jan. 25, 1955 |
| 2,824,897 | Wujciak | Apr. 18, 1961 |
| 2,980,738 | Scribner | Apr. 18, 1961 |
| 3,022,536 | Ver Nooy | Feb. 20, 1962 |

FOREIGN PATENTS

| | | |
|---|---|---|
| 733,471 | Great Britain | July 13, 1955 |
| 854,962 | Great Britain | Nov. 23, 1960 |

OTHER REFERENCES

Cox: American Dyestuff Reporter, March 2, 1953, p. 134.

Baer: Ind. and Eng. Chem., July 1959, pp. 829–30.